(12) United States Patent
Werner et al.

(10) Patent No.: US 11,250,536 B2
(45) Date of Patent: Feb. 15, 2022

(54) IMAGE CAPTURE PREVENTION

(71) Applicant: INTERNATIONAL BUSINESS MACHINES CORPORATION, Armonk, NY (US)

(72) Inventors: John S. Werner, Fishkill, NY (US); Arkadiy O. Tsfasman, Wappingers Falls, NY (US); Gary Chernega, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 400 days.

(21) Appl. No.: 16/566,970

(22) Filed: Sep. 11, 2019

(65) Prior Publication Data

US 2021/0073937 A1 Mar. 11, 2021

(51) Int. Cl.
*G06T 1/00* (2006.01)
*G06T 7/90* (2017.01)
*H04N 5/232* (2006.01)
*H04N 1/32* (2006.01)
*H04N 1/44* (2006.01)
*H04N 1/00* (2006.01)
*H04N 1/21* (2006.01)
(Continued)

(52) U.S. Cl.
CPC .......... *G06T 1/0071* (2013.01); *G06T 1/0021* (2013.01); *G06T 1/0028* (2013.01); *G06T 1/0085* (2013.01); *G06T 7/90* (2017.01); *H04N 1/00875* (2013.01); *H04N 1/2137* (2013.01); *H04N 1/32309* (2013.01); *H04N 1/4074* (2013.01); *H04N 1/444* (2013.01); *H04N 1/4433* (2013.01); *H04N 5/23218* (2018.08); *H04N 5/23229* (2013.01); *H04N 5/23245* (2013.01); *G06T 2201/0051* (2013.01); *H04N 2101/00* (2013.01)

(58) Field of Classification Search
CPC ... G06T 1/0071; G06T 1/0028; G06T 1/0085; G06T 1/0021; G06T 7/90; G06T 2201/0051; G06T 2201/0083; H04N 1/444; H04N 1/4433; H04N 1/32309; H04N 1/4074; H04N 1/2137; H04N 1/00875; H04N 5/23229; H04N 5/23245; H04N 5/23218; H04N 2101/00
USPC .................................................. 348/207.11
See application file for complete search history.

(56) References Cited

U.S. PATENT DOCUMENTS 6,018,374 A 1/2000 Wrobleski
7,206,409 B2 4/2007 Antonellis
(Continued)

OTHER PUBLICATIONS

Mell et al., "The NIST Definition of Cloud Computing", Recommendations of the National Institute of Standards and Technology, Special Publication 800-145, Sep. 2011, 7 pages.
(Continued)

*Primary Examiner* — Pritham D Prabhakher
(74) *Attorney, Agent, or Firm* — Rakesh Roy

(57) ABSTRACT

A method, computer system, and a computer program product for image capture prevention is provided. The present invention may include, in response to embedding at least one digital security mark in a visual communication, securing the visual communication. The present invention may also include preventing, based on the embedded at least one digital security mark, an image capture of the secured visual communication.

18 Claims, 9 Drawing Sheets

(51) Int. Cl.
*H04N 1/407* (2006.01)
*H04N 101/00* (2006.01)

(56) References Cited

U.S. PATENT DOCUMENTS

| | | | |
|---|---|---|---|
| 7,336,712 B1 | 2/2008 | Linnartz | |
| 8,848,059 B2 | 9/2014 | Tiscareno | |
| 8,941,886 B2* | 1/2015 | Kurtz | C09D 11/32 |
| | | | 358/3.28 |
| 8,976,382 B2* | 3/2015 | Kakutani | H04N 1/00846 |
| | | | 358/1.14 |
| 9,350,914 B1* | 5/2016 | Kaur | G06T 5/002 |
| 10,027,850 B2* | 7/2018 | Vandeweerd | H04N 1/4493 |
| 10,521,566 B2* | 12/2019 | Choi | H04L 63/10 |
| 11,115,595 B2* | 9/2021 | Huang | H04N 5/772 |
| 2001/0012019 A1* | 8/2001 | Yamazaki | G09G 5/39 |
| | | | 345/639 |
| 2005/0200705 A1 | 9/2005 | Nieto | |
| 2006/0049262 A1 | 3/2006 | Elo | |
| 2006/0239503 A1* | 10/2006 | Petrovic | G06T 1/0071 |
| | | | 382/100 |
| 2010/0067692 A1* | 3/2010 | Schultz | H04N 5/913 |
| | | | 380/202 |
| 2010/0296795 A1 | 11/2010 | Vizireanu | |
| 2011/0128384 A1* | 6/2011 | Tiscareno | H04N 5/332 |
| | | | 348/164 |
| 2012/0188581 A1* | 7/2012 | Kakutani | H04N 1/00875 |
| | | | 358/1.14 |
| 2013/0335784 A1* | 12/2013 | Kurtz | G06K 1/121 |
| | | | 358/3.28 |
| 2017/0302822 A1* | 10/2017 | Vandeweerd | H04N 1/2137 |
| 2017/0329943 A1* | 11/2017 | Choi | G06F 21/602 |
| 2019/0045078 A1* | 2/2019 | Tung | H04N 1/387 |
| 2019/0313009 A1* | 10/2019 | Alameh | G06K 9/00255 |
| 2019/0349517 A1* | 11/2019 | Kim | H04N 5/23203 |
| 2021/0067699 A1* | 3/2021 | Huang | H04N 5/913 |

OTHER PUBLICATIONS

Zhu et al., "Automating Visual Privacy Protection Using a Smart LED", Proceedings of the 23rd Annual International Conference on Mobile Computing and Networking. ACM, 2017, 14 pages.

* cited by examiner

IMAGE CAPTURE PREVENTION

BACKGROUND

The present invention relates generally to the field of computing, and more particularly to data security.

Users today are equipped with cameras and other image capturing devices (e.g., mobile devices, smart phones) that are capable of capturing or recording high-resolution images and high-resolution videos. As such, in some instances, it may be beneficial to prevent users from unauthorized image or video capturing of data.

SUMMARY

Embodiments of the present invention disclose a method, computer system, and a computer program product for image capture prevention. The present invention may include, in response to embedding at least one digital security mark in a visual communication, securing the visual communication. The present invention may also include preventing, based on the embedded at least one digital security mark, an image capture of the secured visual communication.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
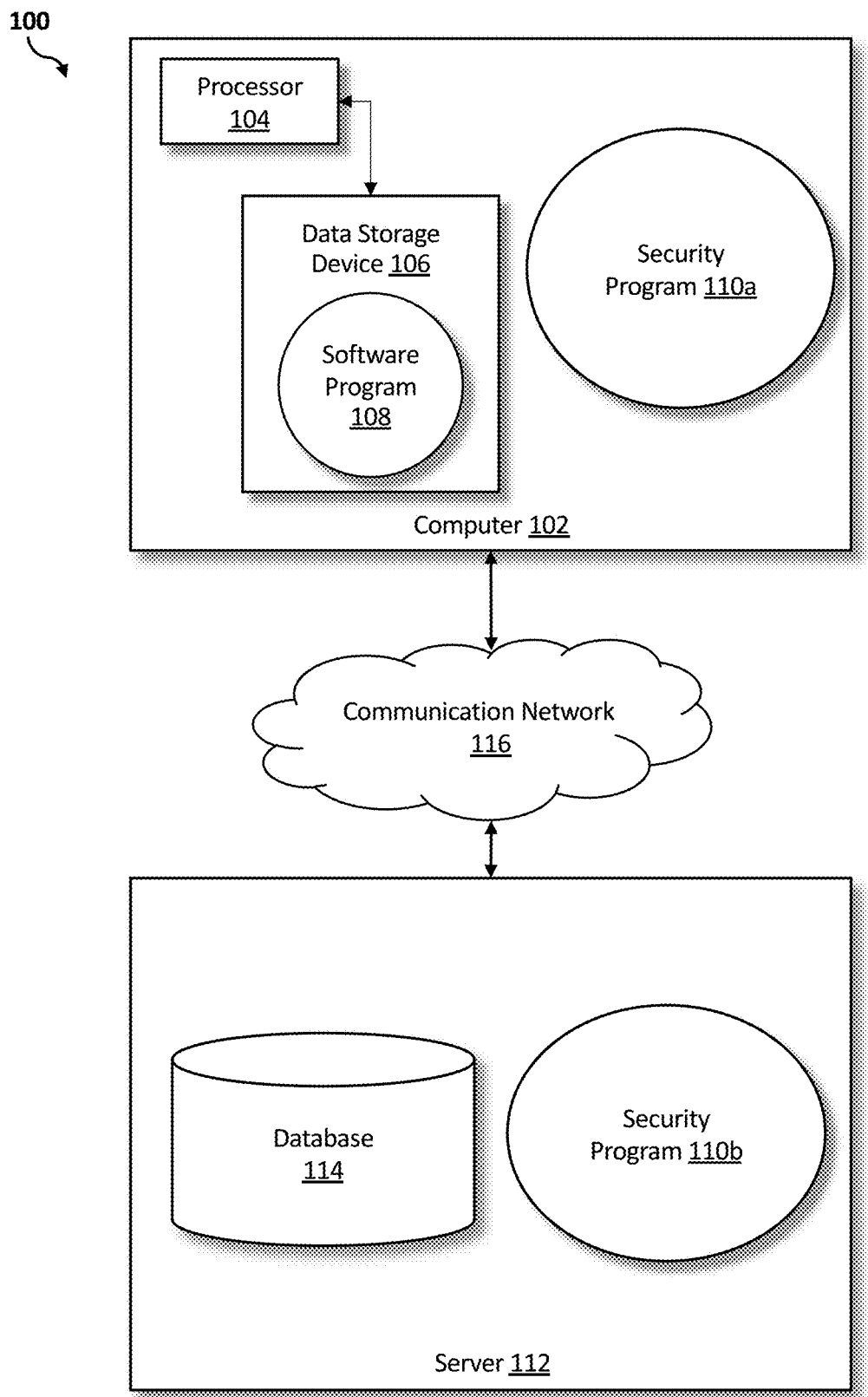
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for securing visual communications. As such, the present embodiment has the capacity to improve the technical field of data security by preventing unauthorized image capturing of visual communications such as, videos, presentations, images, computer/mobile device displays, and any other visual media. More specifically, a security program may secure a visual communication by placing a digital security mark within the visual communication (e.g., within an image/frame of the visual communication) such that the digital security mark may not be detected by a human observer. Then, the security program may recognize the digital security mark placed within a secured visual communication and prevent an image capturing device from capturing an image/video of the secured visual communication. According to the present embodiments, image capture prevention may also include video capture prevention.

As described previously, users today are equipped with cameras and other image capturing devices (e.g., mobile devices, smart phones) that are capable of capturing or recording high-resolution images and high-resolution videos. As such, in some instances, it may be beneficial to prevent users from unauthorized image or video capturing of data. The data may include visual communications or media which are confidential, private, and/or copyrighted.

Therefore, it may be advantageous, to among other things, provide a way to insert digital security marks into a visual communication that may not be detectable through human visual perception but may be recognized by the security program running in the image capturing device to prevent the image capturing device from capturing the secured visual communication.

According to at least one embodiment, a security program may embed one or more digital security marks (e.g., symbols, texts) in multiple locations on any confidential, private, and/or copyrighted visual material such as, presentation slides, image frames, and video frames on computer and mobile device displays. In another embodiment, the security marks may also be embedded into a physical document (e.g., printed image or text document) that is printed using a device running the security program. In one embodiment, the security program may be included as an option (for embedding the security marks) built into an image or word processing software used to create the physical document. In one embodiment, the security program may be included as an option (for embedding the security marks) in a printing device used to print the physical document such that the security marks may be embedded during the printing process.

In one embodiment, the embedded security marks may vary slightly from the colors that are directly behind (e.g., background) such that the embedded security marks blend into the background and are not detectable by the human eye. In another embodiment, when an image or video capturing device attempts to capture an image/video of the secured visual communication, the security program may detect the embedded security marks and may prevent the image/video from being captured or prevent the image/video from being stored to the device.

According to at least one embodiment, if a user wants to protect a visual communication (e.g., visual media, visual content) from being captured on camera, the user may activate a security program to embed (e.g., superimpose) one or more digital security marks into the visual communication via hardware or software. In one embodiment, the security marks may include shapes, icons, symbols, texts, or any other digital indicator which may be recognized by the security program in an image capturing device to prevent the image capture. In at least one embodiment, the digital security marks may be selected from a preset group of security marks.

According to one embodiment, the user may enable a security tool within a presentation software. In another embodiment, the user may enable a security tool in a video viewing/editing software (e.g., to prevent pirating of movies). In one embodiment, the user may enable a security tool in an image viewing/editing software. In another embodiment, the user may enable a security tool on a monitor, laptop, mobile device screen, or projector.

According to one embodiment, a security program may analyze a visual communication to determine the shapes that exist in an initial image/frame/presentation slide (e.g., pre-existing visual objects or shapes) of the visual communication. In one embodiment, if one of the recognized pre-existing visual objects is the same or similar to one of the digital security marks, the same or similar digital security mark may not be used to secure the visual communication. The security program may also create a histogram of the colors of each pixel used in the initial image/frame/presentation slide of the visual communication. In one embodiment, based on the analysis, the security program may select one or more locations across the image/frame/presentation slide for inserting (e.g., embedding) the security marks. The security program may select locations where color variation is minimal across a localized area, such that the security marks may be hidden or camouflaged among the colors. In at least one embodiment, the locations of the security marks may be spread out to cover the entire frame such that the entire frame is protected and a user may not capture an image of a part of the image/frame/presentation slide.

According to at least one embodiment, once the location and the digital security marks are determined, the security program may measure the color value of the determined location and apply a slightly altered color value to the digital security mark. The color of the digital security mark and the color of the specified location may be close enough so that the digital security mark may be imperceivable to a human viewer. The present embodiment may be applied to newly created as well as existing visual communications.

According to at least one embodiment, the security program may be activated when an image capturing device (e.g., camera) is enabled. When the image capturing device is pointed at an object, the frames (e.g., image) seen by the image capturing device may be temporarily stored in a buffer such that the frames may be viewed on a display of the image capturing device by a user. The security program may analyze the frames in real time as the frames are passed through the buffer. In one embodiment, the security program may run the current frame through an image recognition stage to determine the shapes that exist and create a histogram of colors, in real-time. Then, the security program may exclude any shapes that exist in the frame from a search of the digital security marks in the frame. In one embodiment, the security program may determine the most common colors in the frame based on the histogram. In one embodiment, the security program may use a leveling process to perform a bit sweep on a Red-Green-Blue (RGB) spectrum in a specified range around the most common color in the frame. Each frame covered in the sweep range may be processed to determine if any digital security marks exist in the frame. If digital security marks are found, the security marks may be counted, the current sweep may be exited (even if not fully completed), and the security program may repeat the process on the second most common color in the frame. In one embodiment, the security program may run the process for the top n colors in the histogram where n may be a variable depending on the processing speed of the device running the security program. Performing bit sweeps around the top n colors may minimize the number of frames or images that need to be processed. For example, if all combinations of colors were processed, 16,777,216 images (e.g., 256×256×256 bit values) may need to be processed. In one embodiment, a graphics processing unit (GPU) enabled device may be used to perform the bit sweep across the 16,777,216 images.

According to at least one embodiment, the security program may implement an additional filtering process after the initial leveling process. In one embodiment, the additional filtering process may filter out more of the initial image which may further enhance any existing digital security marks and make the digital security marks more recognizable (e.g., via image recognition). In one embodiment, the additional filtering process may include adjusting a threshold (e.g., to enhance black and white colors), hue, saturation, or any other image pixel characteristics.

According to one embodiment, if the count of digital security marks reaches a predetermined threshold, the image may be determined to be confidential and the security program may disable the ability of the user to capture the image (e.g., shutter button may be disabled, screenshots may be disabled, warning of confidential material may be displayed on the screen). In at least one embodiment, the threshold may be reached even if only part of the confidential image is in the frame. However, if the count of the digital security marks does not reach the predetermined threshold, the image may be determined to not be confidential and the user may have the ability to capture the image.

The present embodiment may also prevent a user from capturing an image of a first camera screen (which would detect the security marks and disable image capture) with a second camera. The security program running on the second camera may similarly detect the digital security marks and prevent the image capture. In at least one embodiment, the security program may propagate this process for any number of cameras.

According to one embodiment, the security program may be part of an operating system (OS), firmware, or software update and transmitted (e.g., pushed) to existing mobile devices and cameras via OS or application updates. In at least one embodiment, the security program may be enabled on mobile devices and cameras anytime the camera application is implemented by the user and the user may not have the ability to disable the security program.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a security program 110*a*. The networked computer environment 100 may also include a server 112 that is enabled to run a security program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the security program 110a, 110b may interact with a database 114 that may be embedded in various storage devices, such as, but not limited to a computer/mobile device 102, a networked server 112, or a cloud storage service.

Figure 2:
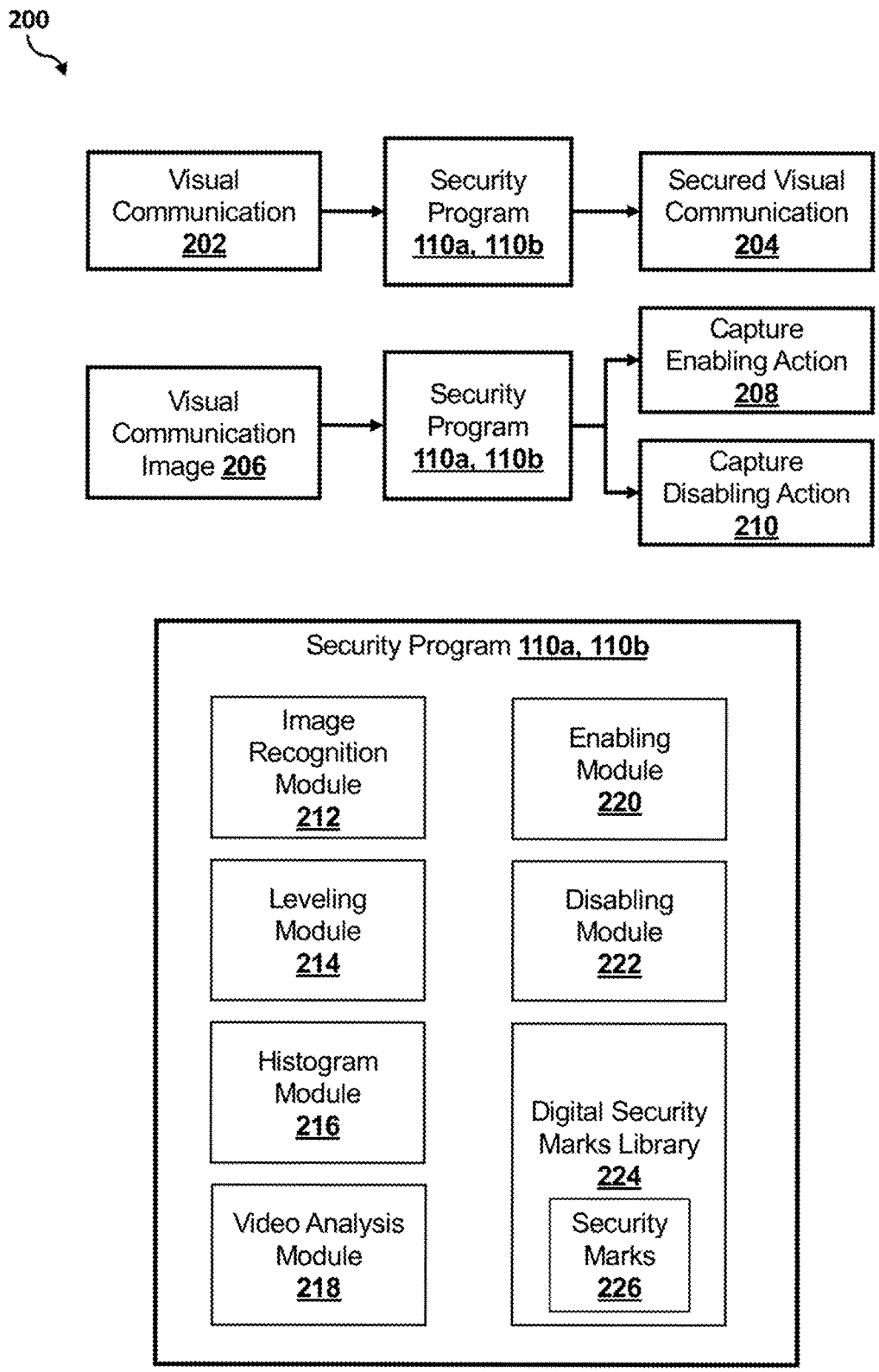
FIG. 2 is a block diagram of a security system according to at least one embodiment.

Referring now to FIG. 2, a block diagram illustrating a security system 200 according to at least one embodiment is depicted.

According to one embodiment, the security system 200 may be provided in the networked computer environment 100 and may be implemented on one or more client computers 102 and/or one or more server computers 112 to embed one or more digital security marks in a visual communication to secure the visual communication and prevent image capture of a secured visual communication based on the one or more embedded digital security marks.

According to one embodiment, the security system 200 may generally include the security program 110a, 110b. The security program 110a, 110b may include a single computer program or multiple program modules or sets of instructions being executed by the processor of the client computer 102/server computer 112. The security program 110a, 110b may include routines, objects, components, units, logic, data structures, and actions that may perform particular tasks or implement particular abstract data types. The security program 110a, 110b may be practiced in distributed cloud computing environments where tasks are performed by remote processing devices that may be linked through the communication network 116.

According to one embodiment, the security program 110a, 110b may receive a visual communication 202 and output a secured visual communication 204, as will be further detailed below. In at least one embodiment, the visual communication 202 may include a video (e.g., movie), a presentation (e.g., presentation slide), an image, a device display (e.g., computer/mobile device), visual media, visual content, or any other digital visual source.

According to another embodiment, the security program 110a, 110b may receive a visual communication image 206 and output either a capture enabling action 208 or a capture disabling action 210, as will be further detailed below. In at least one embodiment, the visual communication image 206 may include an image, frame, slide, video feed, and video stream of the visual communication 202 as seen by an image capturing device.

According to one embodiment, the security program 110a, 110b may include an image recognition module 212, a leveling module 214, a histogram module 216, a video analysis module 218, an enabling module 220, a disabling module 222, and a digital security marks library 224.

According to the present embodiment, the image recognition module 212 may implement machine learning (e.g., computer vision) methods to extract image data from digital images or videos for detecting, identifying, and recognizing objects in the digital images and videos. In one embodiment, the security program 110a, 110b may use the image recognition module 212 to detect, identify, and recognize one or more objects or shapes in the visual communication 202. According to one embodiment, the security program 110a, 110b may register the one or more objects or shapes found in the visual communication 202 by the image recognition module 212 as pre-existing visual objects of the visual communication 202.

According to one embodiment, the security program 110a, 110b may access the digital security marks library 224 to select one or more security marks 226 (e.g., digital security marks) for embedding (e.g., inserting) into the visual communication 202. In at least one embodiment, the security marks 226 in the digital security marks library 224 may be a preset group (e.g., standard) of security marks known to the security program 110a, 110b. In one embodiment, the security marks 226 may include shapes, icons, symbols, texts, or any other digital indicator which may be recognized by the security program 110a, 110b as an indication that the visual communication 202 including the security marks 226 may be confidential and secured. In one embodiment, the security program 110a, 110b may compare the pre-existing visual objects found by the image recognition module 212 in the visual communication 202 against the security marks 226 in the digital security marks library 224 and exclude (e.g., for purposes of being embedded into the visual communication 202) any security marks 226 that may match or may be similar to the pre-existing visual objects in the visual communication 202.

According to one embodiment, the security program 110a, 110b may implement the histogram module 216 to generate a representation (e.g., bar graph) of the distribution of colors (e.g., color histogram) in an image or video included in the visual communication 202. In one embodiment, the X-axis of the histogram may represent a darkest pixel or bit value (e.g., black; 0-bit value), on the right, and a lightest pixel or bit value on the left (e.g., white; 255-bit value). Further, the Y-axis on the histogram may represent the number or frequency of pixels having the specific pixel or bit value. In one embodiment, the histogram module 216 may calculate the number of pixels in the image or video that have the specific colors included in a spectrum or color space. In at least one embodiment, the security program 110a, 110b may implement the histogram module 216 to generate a color histogram in a Red-Green-Blue (RGB) spectrum or color space. In another embodiment, the histogram module 216 may generate the color histogram based on any suitable color space such as, for example, a Cyan-Magenta-Yellow-Black (CMYK) model.

According to one embodiment, the security program 110a, 110b may implement the histogram module 216 to determine one or more locations on the visual communication 202 in which to embed the security marks 226. Specifically, the output of the histogram module 216 may be used to determine one or more common/dominant colors included in the visual communication 202. In one embodiment, based on the output of the histogram module 216, the security program 110a, 110b may determine locations in the image, frame, or slide of the visual communication 202 where a color variation is minimal across a localized area. The security program 110a, 110b may select the locations having minimal color variation such that the security marks 226 may be hidden (e.g., camouflaged) among the color in the selected location.

According to one embodiment, the security program 110a, 110b may implement the leveling module 214 to embed the security marks 226 into the visual communication 202 (e.g., in the image, frame, slide). In one embodiment, the leveling module 214 may include an image processing tool for moving and stretching the brightness levels on a histogram. Specifically, the security program 110a, 110b may use the leveling module 214 to adjust a brightness, contrast, and tonal range by specifying the location of complete black, complete white, and midtones in the histogram (e.g., color histogram generated by the histogram module 216). In one embodiment, the leveling module 214 may determine the color used in a specified area of the visual communication 202 by, for example, measuring a color value (e.g., pixel or bit value) associated with the RGB spectrum. In one embodiment, the leveling module 214 may represent the color as a tuple, which may be three numbers in the RGB color scale (e.g., each number indicating a value for the red channel, green channel, and the blue channel, respectively).

Once the leveling module 214 determines the bit value of the color used in the specified area, the leveling module 214 may apply a color bit value to the security marks 226 within a color modification range. In one embodiment, the color modification range may include specified range (e.g., +/−X) around the measured bit value of the color used in the specified area. In one embodiment, the color modification range may include a small range that is slightly above or slightly below (e.g., +/−2 bit value) relative to the measured bit value of the color used in the specified area. As such, the leveling module 214 may apply a color to the security marks 226 such that the security marks 226, embedded in a location of the visual communication 202, may not be detected through human visual perception (e.g., by human viewer), relative to the color of the location in the visual communication 202. Thereafter, the security program 110a, 110b may implement the leveling module 214 to embed the security marks 226 in the visual communication 202 and output the secured visual communication 204.

According to one embodiment, the security program 110a, 110b may embed a pre-determined number of digital security marks 226 in the output secured visual communication 204. In one embodiment, the security program 110a, 110b may provide the user with the option to select the number of digital security marks 226 that the user wants embedded (e.g., user-defined number) in the output secured visual communication 204. According to one embodiment, the security program 110a, 110b may register the pre-determined number of digital security marks 226 or the user-defined number of digital security marks 226 as a count threshold. According to one embodiment, the security program 110a, 110b may register and store the number of security marks 226 embedded in the secured visual communication 204 (e.g., count threshold) as metadata associated with the secured visual communication 204. According to one embodiment, the count threshold may include a percentage or a set value that is less than the total count of the security marks 226 embedded in the visual communication 202 in order to prevent potential image capture of a portion of the visual communication 202. For example, the security program 110a, 110b may embed eight security marks 266 into the secured visual communication 204. Then, the security program 110a, 110b may set the count threshold for preventing image capture of the secured visual communication 204 to three security marks 226. As such, the security program 110a, 110b may prevent image capture of the secured visual communication 204 after detecting any three of the eight embedded security marks 226. In at least one embodiment, the count threshold may be set to set to as low as one security mark 226, regardless of the number (e.g., more than one) of security marks 226 embedded in the secured visual communication 204.

In one embodiment, the security marks 226 may be embedded across the image, frame, or slide of the visual communication 202 such that a user may not be able to capture a portion of the image, frame, or slide of the visual communication 202 using an image capturing device.

According to one embodiment, the security program 110a, 110b may be automatically enabled when the image capturing device (e.g., camera) is initially implemented (e.g., first turned on) to capture an image of the visual communication 202. When the camera is directed at a subject (e.g., visual communication image 206), the frames or images seen by the camera image sensors may be temporarily stored in a buffer (e.g., temporary memory storage) as RAW image data (e.g., unprocessed image data) and used to generate a view of the subject on a camera display screen for the user. In one embodiment, the video analysis module 218 may access the buffer and retrieve the RAW image data as a visual communication image 206 as the RAW image data passes through the buffer. In at least one embodiment, the visual communication image 206 may include the RAW image data such that the video analysis module 218 may analyze the RAW image data in real-time.

According to one embodiment, the security program 110a, 110b may then implement the image recognition module 212 on the visual communication image 206 (e.g., temporary RAW image data in the buffer) received from the video analysis module 218 to determine one or more pre-existing image objects in the visual communication image 206. Then, the histogram module 216 may be applied to the visual communication image 206 to generate a color histogram and determine the most common or dominant colors represented in the visual communication image 206.

According to one embodiment, the security program 110a, 110b may implement the leveling module 214 to detect if any security marks 226 are embedded in the visual communication image 206 (e.g., in the image, frame, slide) when determining whether to enable the image capture (e.g., capture enabling action 208) or prevent the image capture (e.g., capture disabling action 210).

In one embodiment, the security program 110a, 110b may adjust a color space of the visual communication image 206 relative to one or more of the most common colors included in the visual communication image 206 to determine if any security marks 226 are embedded in the visual communication image 206 that may have a slightly different color (e.g., within the color modification range described above) relative to the most common colors in the visual communication image 206.

In one embodiment, the security program 110a, 110b may execute the leveling module 214 to perform a bit sweep in a specified range around one or more of the most common or dominant colors determined from the color histogram generated by the histogram module 216. In one embodiment, the leveling module 214 may measure a color value (e.g., bit value) for a first color (e.g., color that occurred most frequently based on the histogram) in the visual communication image 206 and perform a first bit sweep in a specified range (e.g., bit sweep range) of the RGB color space around (e.g., relative to) the first color. Then, the leveling module 214 may perform subsequent bit sweeps in the specified range around the next most common colors (e.g., second most, third most, fourth most).

According to one embodiment, the bit sweep range may be a pre-determined range set by the security program 110a, 110b. According to one embodiment, the pre-determined range of the bit sweep range may depend on the color modification range set by the security program 110a, 110b. That is, the bit sweep range in which the leveling module 214 may perform the bit sweep to find the digital security marks 226 may include the same or similar range as the color modification range in which the leveling module 214 may perform the color modification to the digital security marks 226, as described previously. Accordingly, in one embodiment, if the color modification range is +/−3 and the leveling module 214 increases the bit value of the digital security marks by three (e.g., +3), the bit sweep range may also be +/−3 so that the leveling module 214 may perform the bit sweep in the appropriate range and reveal the digital security marks 226 at the +3 bit value. In another embodiment, the bit sweep range may be greater than the color modification range so that the color modification range falls within the bit sweep range and the leveling module 214 may reveal the digital security marks 226 in the overlapping bit values between the color modification range and the bit sweep range.

According to at least one embodiment, the security program 110a, 110b may not include the bit sweep range. For grayscale images, if the security program 110a, 110b does not include the bit sweep range, the leveling module 214 may perform the bit sweep from 0 to 255 (e.g., all pixel or bit values). For color images, if the security program 110a, 110b does not include the bit sweep range, the leveling module 214 may perform the bit sweep from 0-Red, 0-Green, 0-Blue to 255-Red, 255-Green, 255-Blue. Accordingly, the leveling module 214 may perform the bit sweep for all combinations of the red, green, and blue color channels.

According to one embodiment, the leveling module 214 may perform the bit sweep in a top n colors determined from the color histogram generated by the histogram module 216. In one embodiment, n may be a variable (e.g., number of colors) which may depend on the processing speed of the device (e.g., client computer 102; server computer 112) running the security program 110a, 110b.

According to one embodiment, the leveling module 214 may output a sweep image (e.g., adjusted image of the visual communication image 206) for each bit value included in the specified range. In one embodiment, the security program 110a, 110b may run the image recognition module 212 on each sweep image to determine if any digital security marks 226 exist in the sweep image. In one embodiment, if the image recognition module 212 finds digital security marks 226 during a current bit sweep around a specific color, the security program 110a, 110b may count the digital security marks 226 that were found, exit the current bit sweep (e.g., even if the current bit sweep of the specified range is not completed), and implement the leveling module 214 to perform a next bit sweep around a next color of the top n colors.

According to one embodiment, if the count of the security marks 226 does not reach the predetermined threshold, the security program 110a, 110b may determine that the visual communication image 206 is not the secured visual communication 204 (e.g., not confidential data) and may implement the enabling module 220. In one embodiment, the enabling module 220 may perform the capture enabling action 208 which may include allowing the camera to capture and store the visual communication image 206.

According to one embodiment, if the count of the security marks 226 reaches the predetermined threshold, the security program 110a, 110b may determine that the visual communication image 206 is the secured visual communication 204 (e.g., confidential data) and may implement the disabling module 222. In one embodiment, the disabling module may disable the camera and prevent the user from capturing the visual communication image 206. In one embodiment, the disabling module 222 may disable the shutter button of the camera. In one embodiment, the disabling module 222 may wipe the temporary buffer to delete the visual communication image 206 from the camera. In one embodiment, the disabling module 222 may prevent screenshots of a display depicting the secured visual communication 204. In one embodiment, the disabling module 222 may transmit and display a warning message on the screen of the image capturing device indicating that the secured visual communication 204 includes confidential, private, and/or copyrighted information.

According to the present embodiment, a user using a client computer 102 or a server computer 112 may use the security program 110a, 110b (respectively) to secure a visual communication to prevent image capture of the secured visual communication. The security method is explained in more detail below with respect to FIG. 2 (above) and FIGS. 3-6 (detailed below).

Figure 3:
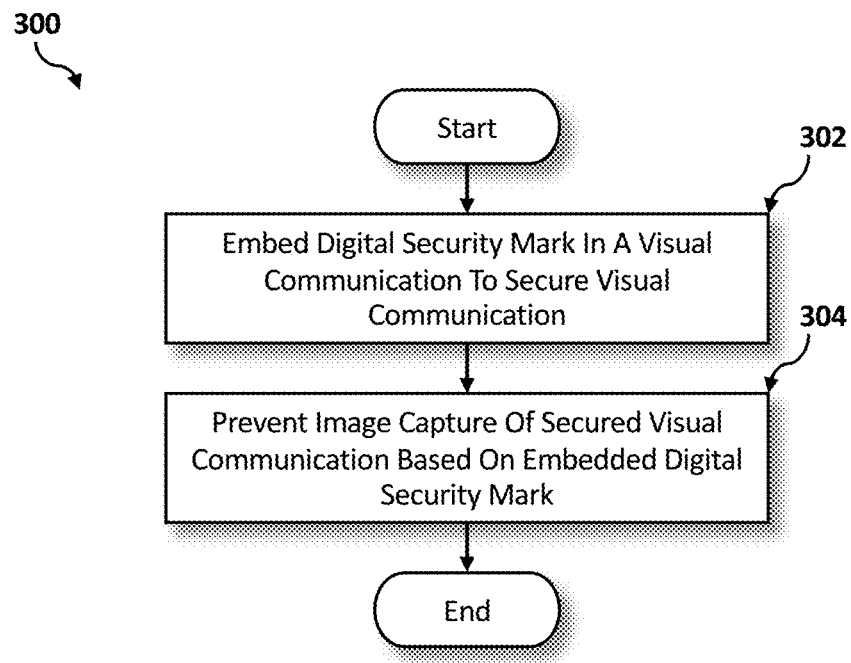
FIG. 3 is an operational flowchart illustrating a security process according to at least one embodiment.

Referring now to FIG. 3, an operational flowchart illustrating the exemplary security process 300 used by the security program 110a and 110b according to at least one embodiment is depicted.

At 302, a digital security mark is embedded in a visual communication to secure the visual communication. The process of 302 will be explained in more detail with reference to FIG. 4, below.

Then at 304, an image capture of a secured visual communication is prevented based on the embedded digital security mark. The process of 304 will be explained in more detail with reference to FIG. 5, below.

Figure 4:
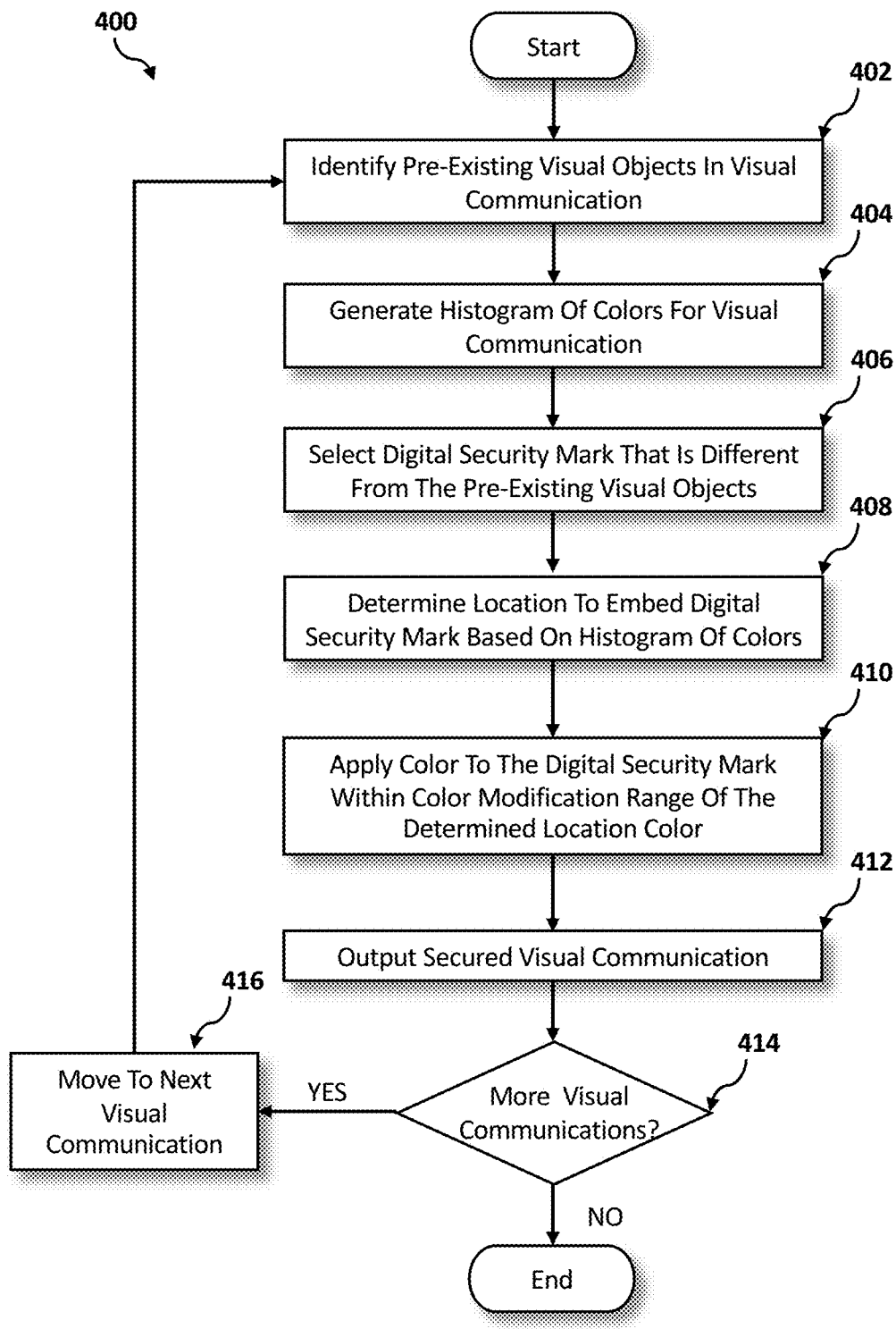
FIG. 4 is an operational flowchart illustrating an embedding process of the security process according to at least one embodiment.

Referring now to FIG. 4, an operational flowchart illustrating the exemplary embedding process 400 used by the security program 110a and 110b according to at least one embodiment is depicted.

At 402, pre-existing visual objects are identified in a visual communication. According to one embodiment, a user may implement the security program 110a, 110b to prevent a visual communication (e.g., visual communication 202) from being captured later by an image capturing device (e.g., camera). In one embodiment, the user may enable the security program 110a, 110b within a presentation software. In one embodiment, the user may enable the security program 110a, 110b within a video viewing/editing software. In one embodiment, the user may enable the security program 110a, 110b within an image viewing/editing software. In one embodiment, the user may enable the security program 110a, 110b within a hardware, such as, for example, a monitor, laptop, mobile device screen, or projector. Once the security program 110a, 110b is enabled by the user, the security program 110a, 110b may implement the image recognition module 212 to detect, identify, and recognize one or more pre-existing visual objects in the visual communication, as previously described with reference to FIG. 2.

For example, the user enables the security program 110a, 110b within a presentation software to secure a presentation slide. The security program 110a, 110b implements the image recognition module 212 and detects a group of text and circular symbols in the presentation slide. The security program 110a, 110b registers the group of text and the circular symbols as the pre-existing visual objects of the presentation slide.

Then at 404, a histogram of colors is generated for the visual communication. According to one embodiment, the security program 110a, 110b may implement the histogram module 216 to generate a representation of the distribution of colors (e.g., color histogram) in an image or video included in the visual communication 202, as previously described with reference to FIG. 2.

Continuing with the previous example, the security program 110a, 110b implements the histogram module 216 to generate a color histogram of the presentation slide. The color histogram indicates that, in this example, the most common colors in the presentation slide are white, pink, and orange.

Then at 406, digital security marks that are different from the pre-existing visual objects are selected. According to one embodiment, the security program 110a, 110b may access the digital security marks library 224 to select one or more security marks 226 (e.g., digital security marks) for embedding (e.g., inserting) into the visual communication 202, as previously described with reference to FIG. 2. In one embodiment, the security program 110a, 110b may select one or more digital security marks 226 that are different from the pre-existing visual objects found in the visual communication at 402.

Continuing with the previous example, the security program 110a, 110b accesses the digital security marks library 224 and selects an octagon symbol as the security mark 226 so that the security mark 226 does not match the pre-existing visual objects (group of text and circular symbols) found in the presentation slide at 402.

Then at 408, a location to embed the digital security marks is determined based on the histogram of colors. According to one embodiment, the security program 110a, 110b may use the output of the histogram module 216 determine locations in the image, frame, or slide of the visual communication 202 where a color variation is minimal across a localized area, as previously described with reference to FIG. 2.

Continuing with the previous example, based on the output of the histogram module 216, the security program 110a, 110b finds a first pink-colored location where the color variation is minimal across the localized area and a second orange-colored location where the color variation is minimal across the localized area. As such, the security program 110a, 110b selects the first pink-colored location and the second orange-colored location for embedding the security marks 226.

Then at 410, the security program 110a, 110b applies a color to the digital security mark that is within a color modification range of a determined location color. According to one embodiment, the security program 110a, 110b may implement the leveling module 214 to measure a first color value (e.g., pixel or bit value) in a specified area of the visual communication 202 to determine the color used in the specified area (e.g., determined location color) of the visual communication 202, as previously described with reference to FIG. 2. Then, the security program 110a, 110b may implement the leveling module 214 to apply a second color value (e.g., pixel or bit value) to the security marks 226 that is within the color modification range of the determined location color (e.g., bit value of the color used in the specified area), as previously described with reference to FIG. 2.

Continuing with the previous example, the security program 110a, 110b implements the leveling module 214 to measure the bit value of the first pink-colored location and apply a color to a first set of the security marks 226 within the color modification range of +/−2 of the measured bit value of the first pink-colored location. The leveling module 214 returns the measured bit value as 240-R, 103-G, 222-B. Then, the leveling module 214 applies a color (within the color modification range of +/−2) to the first set of the security marks 226, resulting in a slightly altered pink color with a bit value of 241-R, 104-G, 223-B. Similarly, the security program 110a, 110b implements the leveling module 214 to measure the bit value of the second orange-colored location and apply a color to a second set of the security marks 226 within the color modification range of +/−2 of the measured bit value of the second orange-colored location. The leveling module 214 returns the measured bit value as 245-R, 119-G, 10-B. Then, the leveling module 214 applies a color (within the color modification range of +/−2) to the second set of the security marks 226, resulting in a slightly altered orange color with a bit value of 246-R, 120-G, 11-B.

Then at 412, the security program 110a, 110b outputs a secured visual communication. According to one embodiment, after applying the color to the security marks 226, the security program 110a, 110b may implement the leveling module 214 to embed the security marks 226 in the visual communication 202 and output the secured visual communication 204, as previously described with reference to FIG. 2.

Continuing with the previous example, the security program 110a, 110b implements the leveling module 214 to embed two security marks 226 in the first location of the slide and two security marks 226 in the second location of the slide. Then the security program 110a, 110b outputs the secured slide (e.g., secured visual communication 204) including the four embedded security marks 226.

Thereafter at 414, the security program 110a, 110b determines if more visual communications remain to be secured. If at 414, the security program 110a, 110b determines that there are more visual communications (e.g., additional images, frames, slides of the visual communication 202) that may need to be secured at 414, then at 416, the security program 110a, 110b moves to the next visual communication 416 and returns to 402 to repeat the embedding process 400. However, if at 414 the security program 110a, 110b determines that are no more visual communications that may need to be secured, the embedding process 400 ends.

Continuing with the previous example, after outputting the secured slide at 412, the security program 110a, 110b determines that there are no additional slides. As such, the security program 110a, 110b ends the embedding process 400.

Figure 5:
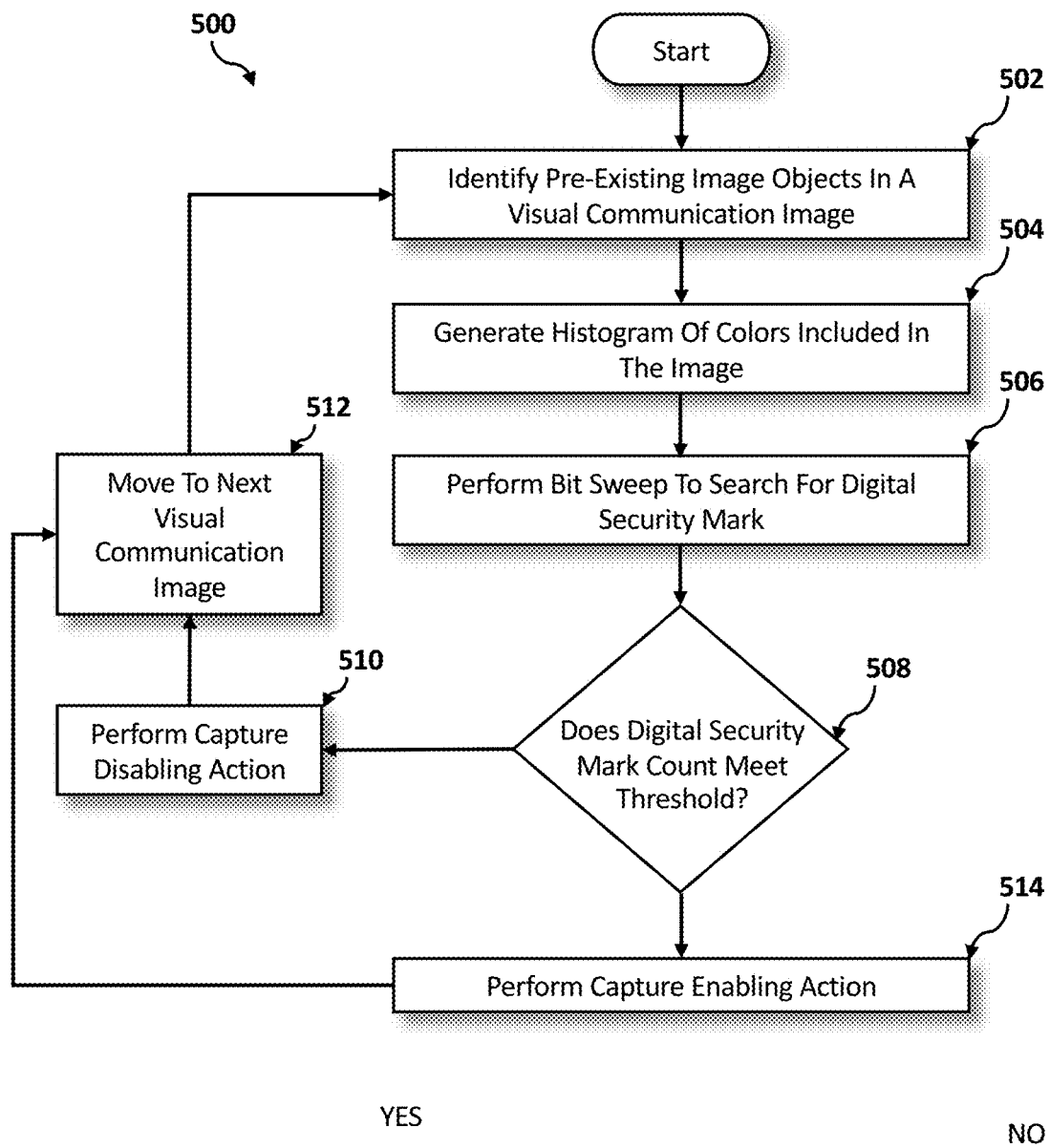
FIG. 5 is an operational flowchart illustrating a capture prevention process of the security process according to at least one embodiment.
Figure 6:
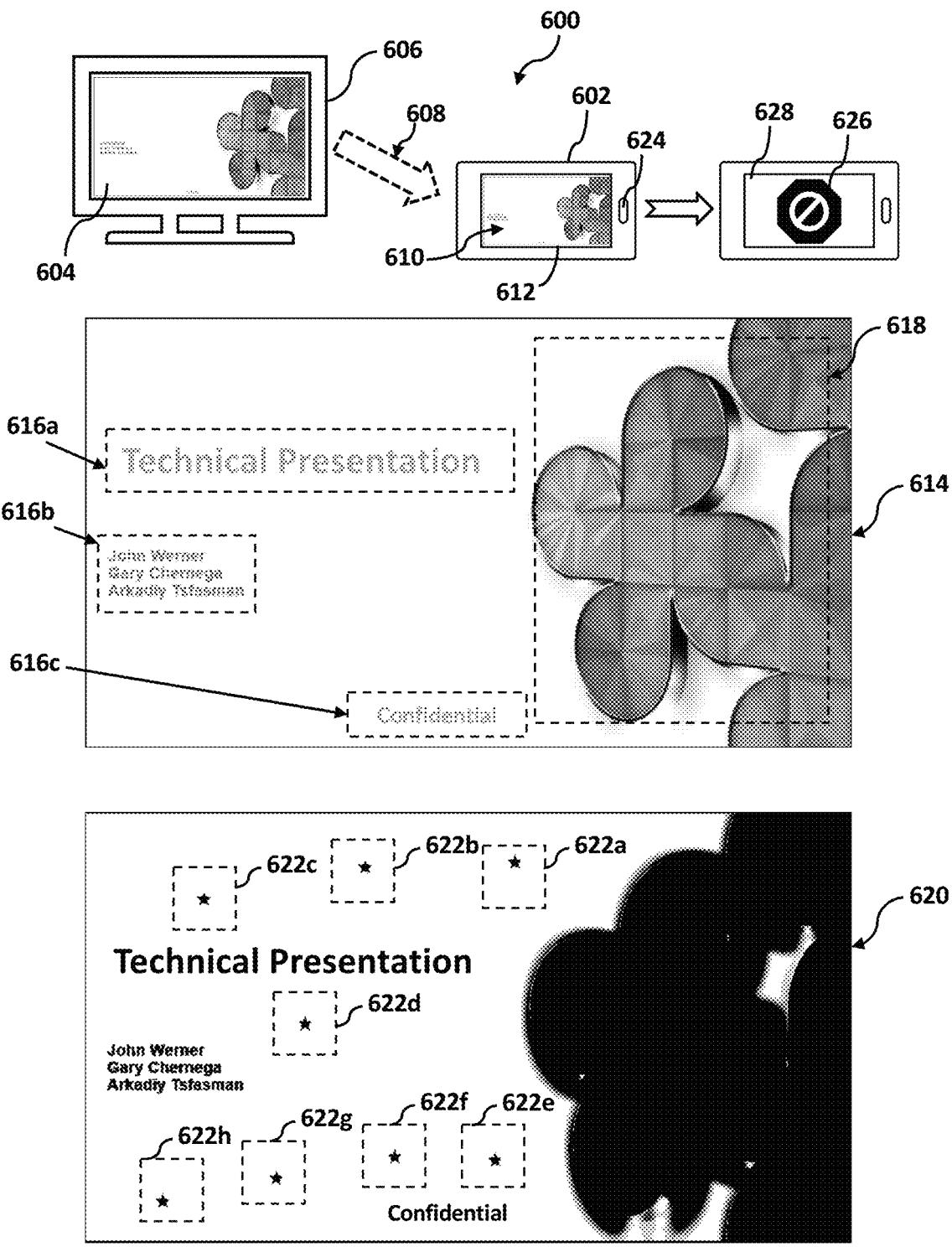
FIG. 6 is a block diagram illustrating a real-time capture prevention environment implementing the capture prevention process of FIG. 5, according to at least one embodiment.

Referring now to FIG. 5, an operational flowchart illustrating the exemplary capture prevention process 500 used by the security program 110a and 110b according to at least one embodiment is depicted. Referring also to FIG. 6, an exemplary illustration of a real-time capture prevention environment 600 using the exemplary prevention process 500 of the security program 110a and 110b according to at least one embodiment is depicted.

At 502, pre-existing image objects are identified in a visual communication image. According to one embodiment, the security program 110a, 110b running on the client computer 102 (e.g., mobile device) or the server computer 112 may be automatically activated when the image capturing device or component (e.g., camera of the mobile device) is enabled (e.g., camera application is initialized).

According to one embodiment, the security program 110a, 110b may implement the video analysis module 218 to process the visual communication image 206 in real-time as the camera is directed towards the visual communication 202 or the secured visual communication 204. In one embodiment, the camera image sensors may temporarily store unprocessed or unfiltered image data (e.g., RAW image data) in a buffer (e.g., temporary memory storage) of the image capturing device. The RAW image data may be used to generate a view of the image on a display screen of the image capturing device. As the RAW image data passes through the buffer, the security program 110a, 110b may implement the video analysis module 218 to access (e.g., read) the buffer and retrieve the RAW image data as a visual communication image 202 for real-time analysis by the security program 110a, 110b, as described previously with reference to FIG. 2. Then, the security program 110a, 110b may implement the image recognition module 212 to determine one or more pre-existing image objects in the visual communication image 206, as described previously with reference to FIG. 2. According to one embodiment, the security program 110a, 110b may exclude any pre-existing image objects found in the visual communication image 206 in the subsequent search for the security marks 226.

For example, in the real-time capture prevention environment 600 (FIG. 6), a mobile device 602 (running the security program 110a, 110b) is engaged by a user to capture an image of a presentation slide 604 (similar to visual communication 202) being displayed on a computer screen 606.

When a camera application is activated on the mobile device 602, image data 608 of the presentation slide 604 is received by the camera image sensors of the mobile device 602 and temporarily stored in a buffer as RAW image data. The mobile device 602 uses the RAW image data to generate a display image 610 of the presentation slide 604 and renders the display image 610 on a display screen 612 of the mobile device 602.

When the camera application is activated on the mobile device 602, the security program 110a, 110b is automatically enabled. As the RAW image data passes through the buffer and is rendered as the display image 610 on the display screen 612, the security program 110a, 110b implements the video analysis module 218 to access the buffer and retrieve the RAW image data as a visual communication image 614 (similar to visual communication image 204) for real-time analysis by the security program 110a, 110b. Then, the security program 110a, 110b runs the image recognition module 212 to perform real-time image recognition on the visual communication image 614 to determine (e.g., find) the one or more pre-existing image objects in the visual communication image 614. In response, the image recognition module 212 finds a group of text objects 616a, 616b, 616c and a group of circular objects 618. The security program 110a, 110b registers the group of text objects 616a, 616b, 616c and the group of circular objects 618 as the pre-existing image objects of the visual communication image 614.

Then at 504, a histogram of colors is generated from the visual communication image. According to one embodiment, the security program 110a, 110b may execute the histogram module 216 to generate a color histogram representing the visual communication image 206, as described previously with reference to FIG. 2.

Continuing with the previous example, the security program 110a, 110b executes the histogram module 216 to generate a color histogram of the visual communication image 614 associated with the RAW image data of the presentation slide 604. Based on the generated color histogram, the security program 110a, 110b determines that the visual communication image 614 is a grayscale image where white and gray are the two most common or dominant colors depicted in the visual communication image 614. Specifically, the security program 110a, 110b determines that a shade of gray having a bit value of 128 (in the black/white bit range from 0 to 255) and white having a bit value of 255 are the most dominant colors depicted in the visual communication image 614.

Then at 506, a bit sweep is performed to search for one or more digital security marks. According to one embodiment, the security program 110a, 110b may implement the leveling module 214 to detect if any security marks 226 are embedded in the visual communication image 206 (e.g., in the image, frame, slide), as described previously with reference to FIG. 2. In at least one embodiment, the leveling module 214 may operate around the most common colors (e.g., top n colors) determined from the color histogram generated by the histogram module 216. Specifically, in one embodiment, the leveling module 214 may measure a bit value associated with a first color (e.g., color that occurred most frequently based on the histogram) and perform a first bit sweep in a specified range (e.g., bit sweep range) of the RGB spectrum around the first color. For greyscale images, such as the visual communication image 614, the bit sweep may only need to be performed in the black and white spectrum.

According to one embodiment, as the leveling module 214 performs the bit sweep, the leveling module 214 may output a sweep image for each bit value included in the bit sweep range. Then, the security program 110a, 110b may run the image recognition module 212 on each sweep image to determine if any digital security marks 226 exist in the sweep image.

Continuing with the previous example, the security program 110a, 110b implements the leveling module 214 to perform the bit sweep around the most dominant color, white, depicted in the visual communication image 614. The security program 110a, 110b sets the bit sweep range to +/−5. The leveling module 214 measures the bit value of the white and determines the bit value to equal 255-White. Thereafter, the leveling module 214 performs the bit sweep by adjusting the bit value of the white from 250 through 254 and outputs a sweep image for each iteration. Then, the security program 110a, 110b runs the image recognition module 212 on the sweep images to determine if any digital security marks 226 exist in the sweep images. In response, the image recognition module 212 finds a group of digital security marks 622a, 622b, 622c, 622d, 622e, 622f, 622g, 622h in one of the sweep images 620.

Thereafter at 508, the security program 110a, 110b determines whether a count of the digital security marks meets a threshold. According to one embodiment, the security program 110a, 110b may embed a pre-determined number of digital security marks 226 in the output secured visual communication 204. In one embodiment, the security program 110a, 110b may provide the user with the option to select the number of digital security marks 226 that the user wants embedded (e.g., user-defined number) in the output secured visual communication 204. According to one embodiment, the security program 110a, 110b may register the pre-determined number of digital security marks 226 or the user-defined number of digital security marks 226 as a count threshold. As described previously with reference to FIG. 2, the count threshold may be set to a percentage or value (e.g., 1 or 2 security marks 226) that is less the number of digital security marks 226 in embedded the output secured visual communication 204 so that a user is unable to capture a partial image of the secured visual communication 204.

If the security program 110a, 110b determines that the count of the digital security marks 226 meets the count threshold at 508, then at 510, the security program 110a, 110b performs a capture disabling action. According to one embodiment, if the count of the digital security marks 226 meets the count threshold, the security program 110a, 110b may determine that the visual communication image 206 is the secured visual communication 204 and implement the disabling module 222 to perform the capture disabling action 210, as described previously with reference to FIG. 2. According to one embodiment, the capture disabling action 210 may include preventing image capture of the visual communication image 206 (e.g., via disabling camera shutter button, disabling screenshot controls). In one embodiment, preventing image capture of the visual communication image 206 may also include erasing or wiping the buffer of the image capturing device to delete the RAW image data that may be temporarily stored in the buffer. In one embodiment, the disabling module 222 may transmit a warning message, via a graphical user interface (GUI) to the display screen of the image capturing device indicating that the user is attempting to, and prevented from capturing an image of confidential, private, and/or copyrighted material. In another embodiment, in response to the user engaging a camera shutter button, the security program 110a, 110b may implement the disabling module 222 to transmit the warning message to the display screen via the GUI of the image capturing device.

Then at 512, the security program 110a, 110b moves to the next visual communication image 206 (if available) and returns to 502 to repeat the capture prevention process 500.

However, if the security program 110a, 110b determines that the count of the digital security marks 226 does not meet the count threshold at 508 after performing the bit sweep for the most common colors in the visual communication image 206, then at 514, the security program 110a, 110b performs a capture enabling action. According to one embodiment, if the count of the digital security marks 226 does not meet the count threshold, the security program 110a, 110b may determine that the visual communication image 206 is an unsecured visual communication (e.g., not confidential, private, and/or copyrighted material) and implement the enabling module 220 to perform the capture enabling action 208, as described previously with reference to FIG. 2. In one embodiment, the security program 110a, 110b may run the enabling module 220 to allow the image capturing device to capture and store the visual communication image 206. Then the security program 110a, 110b moves to the next visual communication image 206 (if available) at 512 returns to 502 to repeat the capture prevention process 500, as described above.

Continuing with the previous example, the security program 110a, 110b counts eight digital security marks in the group of digital security marks 622a, 622b, 622c, 622d, 622e, 622f, 622g, 622h and determines that the count of the digital security marks meets or exceeds the count threshold of two digital security marks set by the security program 110a, 110b. Accordingly, the security program 110a, 110b determines that the visual communication image 614 is the secured visual communication 204 and implements the disabling module 222 to disable a camera shutter button 624 of the mobile device 602 such that the mobile device 602 does not perform the image capture upon actuation of the camera shutter button 624. When the user engages the camera shutter button 624, the disabling module 222 transmits a warning message 626 via the GUI of the mobile device 602, as depicted in a display screen transition 628. Thereafter, the security program 110a, 110b implements the disabling module 222 to wipe the buffer of the mobile device 602 and delete the RAW image data including the visual communication image 614.

The functionality of a computer may be improved by the security program 110a, 110b because the security program 110a, 110b may enable a computer to analyze a visual communication, create a histogram of the color space of the visual communication, recognize existing shapes within the visual communication using image recognition, and insert security marks into the visual communication. The security program 110a, 110b may enable a computer to select security marks that do not match existing shapes that may be in the visual communication. The security program 110a, 110b may enable a computer to place the security marks sporadically around the visual communication to cover the entire frame and in regions of color that match the most frequent colors determined by the histogram. The security program 110a, 110b may enable a computer to select a color for the security marks that may vary slightly from a color of the location where the security marks may be inserted.

The functionality of a computer may also be improved by the security program 110a, 110b because the security program 110a, 110b may enable a computer to analyze RAW images seen by camera image sensors and prevent image capture of a visual communication if the RAW images contain security marks. The security program 110a, 110b may enable a computer to use a leveling module to alter the color space of the RAW images and perform image recognition to locate the security marks contained in the RAW images.

It may be appreciated that FIGS. 2 to 6 provide only an illustration of one embodiment and do not imply any limitations with regard to how different embodiments may be implemented. Many modifications to the depicted embodiment(s) may be made based on design and implementation requirements.

Figure 7:
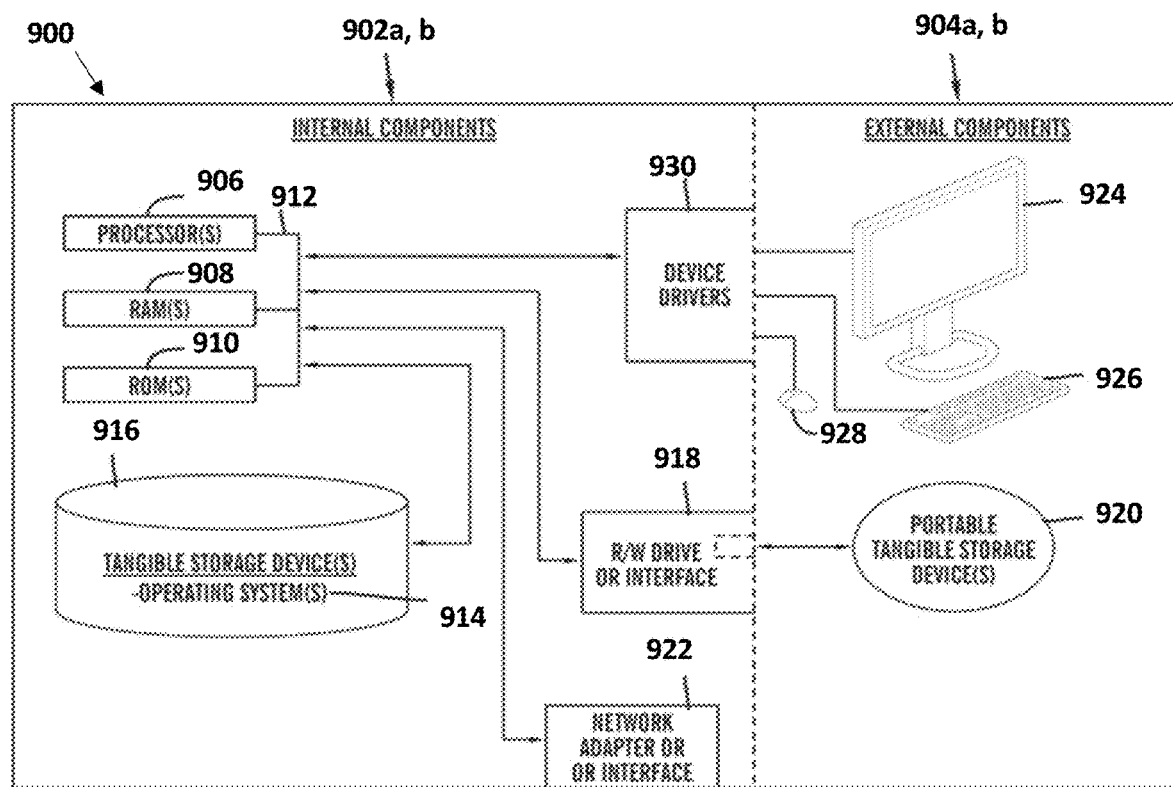
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 7. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the security program 110*a* in client computer 102, and the security program 110*b* in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the security program 110*a* and 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the security program 110*a* in client computer 102 and the security program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the security program 110*a* in client computer 102 and the security program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
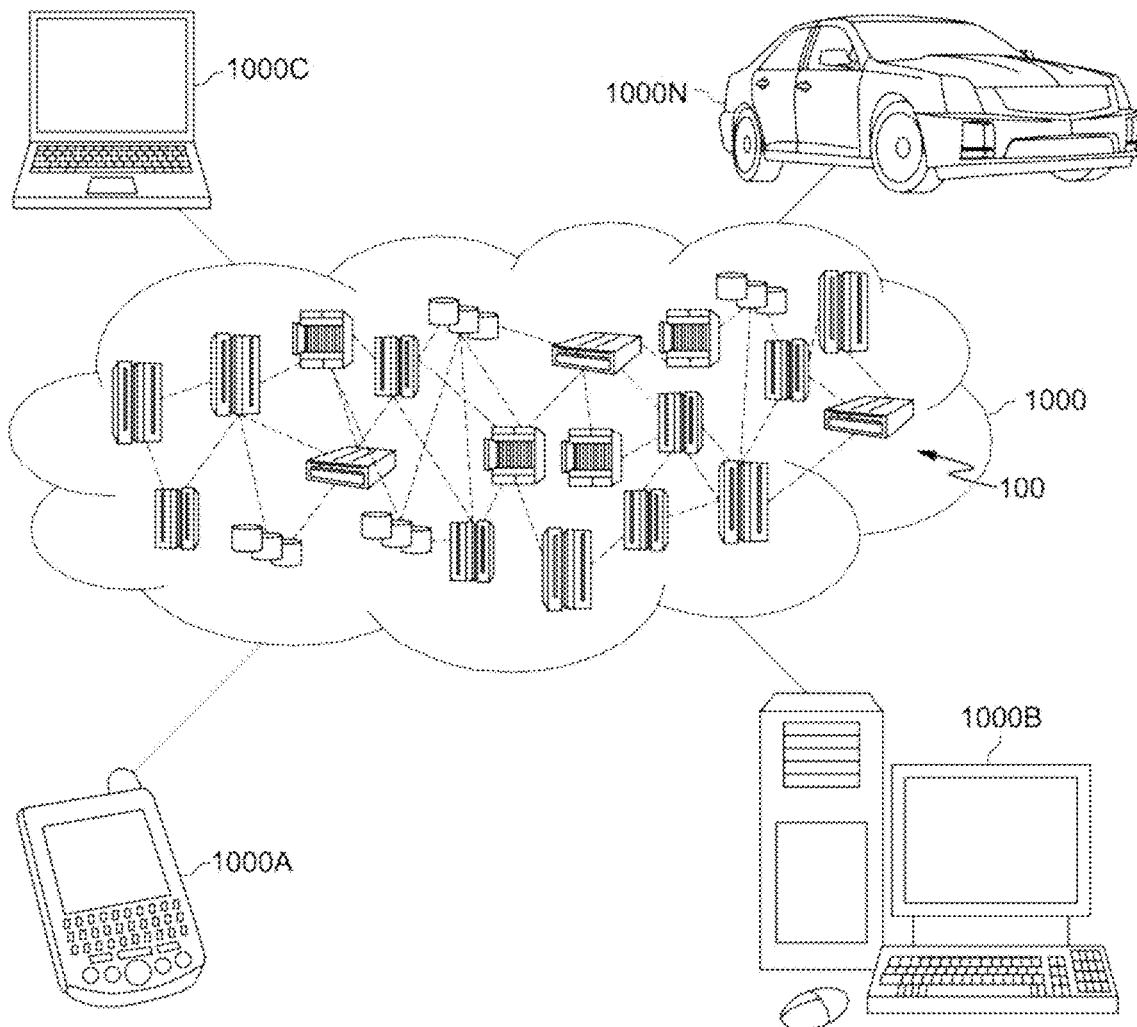
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
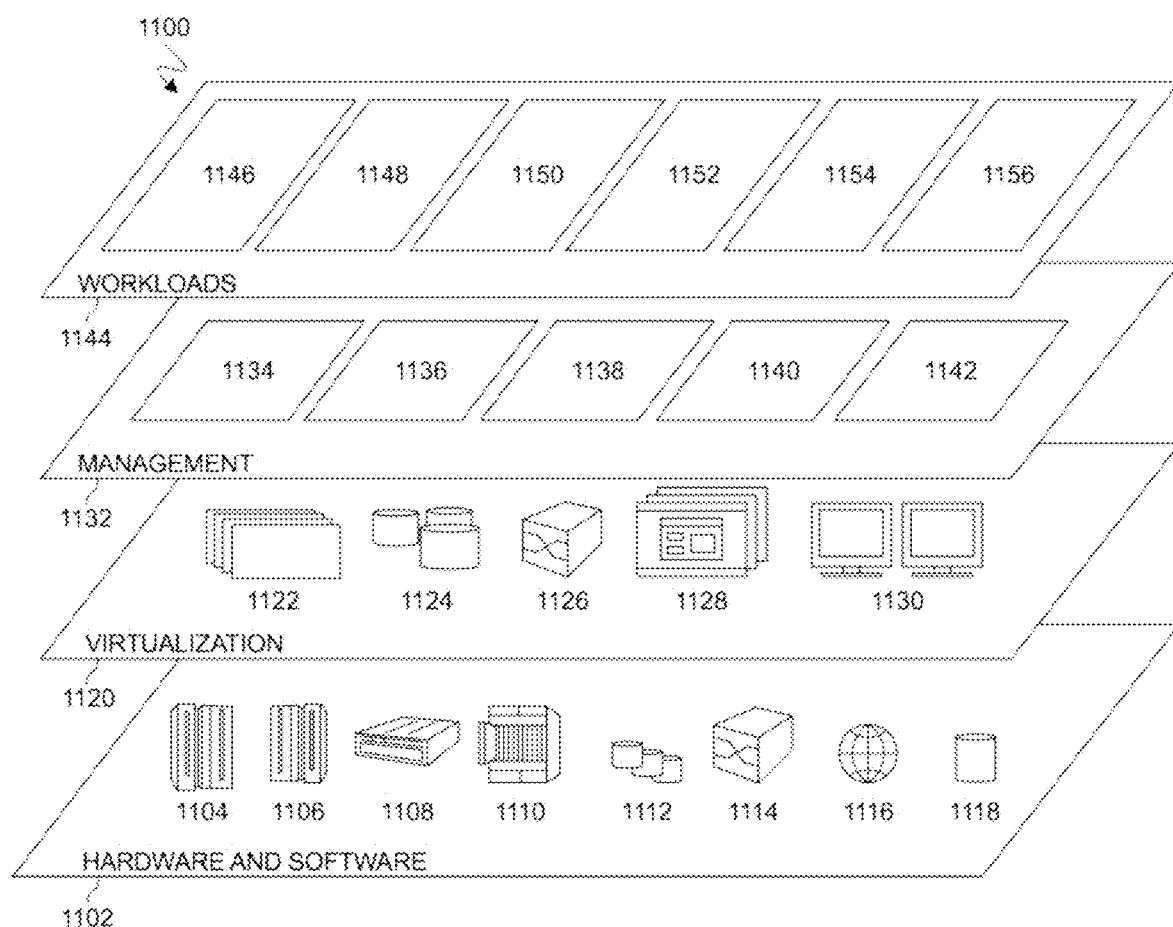
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and security 1156. A security program 110a, 110b provides a way to prevent image capture of a secured visual communication.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method comprising:
in response to embedding at least one digital security mark in a visual communication, securing the visual communication;

measuring at least one color depicted in a visual communication image stored in a buffer, wherein the visual communication image stored in the buffer corresponds to the secured visual communication;

adjusting a color space of the visual communication image relative to the measured at least one color;

determining that the visual communication image includes the embedded at least one digital security mark in the adjusted color space of the visual communication image; and preventing, based on the embedded at least one digital security mark, an image capture of the secured visual communication.

2. The method of claim 1, further comprising:

identifying, in the visual communication, at least one pre-existing visual object; and selecting the embedded at least one security mark such that the selected at least one security mark is different from the identified at least one pre-existing visual object in the visual communication.

3. The method of claim 2, further comprising:

generating a histogram representing a distribution of colors in the visual communication;

determining, based on the generated histogram, at least one location of the visual communication including a minimal color variation across a localized area; and embedding the selected at least one digital security mark in the determined at least one location of the visual communication.

4. The method of claim 3, wherein the determined at least one location of the visual communication includes a dominant color represented in the visual communication.

5. The method of claim 3, further comprising:

measuring a first color value associated with the determined at least one location in the visual communication; and applying, based on the measured first color value, a second color value to the embedded at least one digital security mark, wherein the embedded at least one digital security mark is undetectable in the determined at least one location of the visual communication using human visual perception.

6. The method of claim 1, wherein adjusting the color space of the visual communication image relative to the measured at least one color further comprises:

performing a bit sweep in a specified range of color values around the measured at least one color; and generating, based on the performed bit sweep, at least one adjusted image associated with the visual communication image.

7. The method of claim 6, further comprising:

in response to analyzing, using image recognition, the generated at least adjusted image associated with the visual communication image, identifying a number of the embedded at least one digital security mark.

8. The method of claim 7, further comprising:

determining that the identified number of the embedded at least one digital security mark meets a count threshold;

identifying the visual communication image as the secured visual communication; and erasing a buffer storing the identified visual communication image.

9. A computer system for image capture prevention, comprising:

one or more processors, one or more computer-readable memories, one or more non-transitory computer-readable tangible storage media, and program instructions stored on at least one of the one or more non-transitory computer-readable tangible storage media for execution by at least one of the one or more processors via at least one of the one or more memories, wherein the computer system is capable of performing a method comprising:

in response to embedding at least one digital security mark in a visual communication, securing the visual communication;

measuring at least one color depicted in a visual communication image stored in a buffer, wherein the visual communication image stored in the buffer corresponds to the secured visual communication;

adjusting a color space of the visual communication image relative to the measured at least one color;

determining that the visual communication image includes the embedded at least one digital security mark in the adjusted color space of the visual communication image; and preventing, based on the embedded at least one digital security mark, an image capture of the secured visual communication.

10. The computer system of claim 9, further comprising:

identifying, in the visual communication, at least one pre-existing visual object; and selecting the embedded at least one security mark such that the selected at least one security mark is different from the identified at least one pre-existing visual object in the visual communication.

11. The computer system of claim 10, further comprising:

generating a histogram representing a distribution of colors in the visual communication;

determining, based on the generated histogram, at least one location of the visual communication including a minimal color variation across a localized area; and embedding the selected at least one digital security mark in the determined at least one location of the visual communication.

12. The computer system of claim 11, wherein the determined at least one location of the visual communication includes a dominant color represented in the visual communication.

13. The computer system of claim 11, further comprising:

measuring a first color value associated with the determined at least one location in the visual communication; and applying, based on the measured first color value, a second color value to the embedded at least one digital security mark, wherein the embedded at least one digital security mark is undetectable in the determined at least one location of the visual communication using human visual perception.

14. The computer system of claim 9, wherein adjusting the color space of the visual communication image relative to the measured at least one color further comprises:

performing a bit sweep in a specified range of color values around the measured at least one color; and generating, based on the performed bit sweep, at least one adjusted image associated with the visual communication image.

15. The computer system of claim 14, further comprising:

in response to analyzing, using image recognition, the generated at least adjusted image associated with the visual communication image, identifying a number of the embedded at least one digital security mark.

16. The computer system of claim 15, further comprising:
determining that the identified number of the embedded at least one digital security mark meets a count threshold;
identifying the visual communication image as the secured visual communication; and
erasing a buffer storing the identified visual communication image.

17. A computer program product for image capture prevention, the computer program product comprising a non-transitory computer readable storage medium having program instructions embodied therewith, the program instructions executable by a processor to cause the processor to:
in response to embedding at least one digital security mark in a visual communication, securing the visual communication;
measuring at least one color depicted in a visual communication image stored in a buffer, wherein the visual communication image stored in the buffer corresponds to the secured visual communication;
adjusting a color space of the visual communication image relative to the measured at least one color;
determining that the visual communication image includes the embedded at least one digital security mark in the adjusted color space of the visual communication image; and
preventing, based on the embedded at least one digital security mark, an image capture of the secured visual communication.

18. The computer program product of claim 17, further comprising:
identifying, in the visual communication, at least one pre-existing visual object; and
selecting the embedded at least one security mark such that the selected at least one security mark is different from the identified at least one pre-existing visual object in the visual communication.

* * * * *